United States Patent
Heya (10) Patent No.: US 6,975,381 B2
(45) Date of Patent: Dec. 13, 2005

(54) IMAGE PRINTING SYSTEM (75) Inventor: Shinichi Heya, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 10/710,441

(22) Filed: Jul. 12, 2004

(65) Prior Publication Data
US 2005/0007568 A1 Jan. 13, 2005

(30) Foreign Application Priority Data
Jul. 10, 2003 (JP) ............... 2003-194804

(51) Int. Cl.$^7$ ............... G03B 29/00; G03B 27/52
(52) U.S. Cl. ............... 355/29; 355/28; 355/40
(58) Field of Search ............... 355/18, 27, 28, 355/29, 40, 41; 396/566, 587, 613

(56) References Cited

U.S. PATENT DOCUMENTS

| 4,131,041 A | 12/1978 | Ludemann et al. ............ 83/94 |
| 4,974,394 A | 12/1990 | Suzuki ............ 53/435 |
| 5,093,684 A * | 3/1992 | Crochetierre et al. ......... 355/40 |
| 5,126,785 A | 6/1992 | Nagel Erich et al. ......... 355/28 |
| 6,160,609 A * | 12/2000 | Inoue ............ 355/41 |
| 2002/0106207 A1 * | 8/2002 | Beggiao ............ 396/613 |
| 2004/0252286 A1 * | 12/2004 | Murray et al. ............ 355/28 |

FOREIGN PATENT DOCUMENTS

| EP | 0 672 937 A1 | 9/1995 |
| EP | 0 726 496 | 8/1996 |
| JP | 9-171219 | 6/1997 |
| JP | 9-304838 | 11/1997 |

OTHER PUBLICATIONS

European Search Report dated Oct. 26, 2004.
Office Action of European Patent Appln. No. 04016276.0 dated Aug. 12, 2005.

* cited by examiner

Primary Examiner—Alan Mathews
(74) Attorney, Agent, or Firm—Armstrong, Kratz, Quintos, Hanson & Brooks, LLP (57) ABSTRACT An image printing system is a system which forms images continuously on a long photosensitive material. The image printing system includes an inputting unit for making reservations for cutting of the photosensitive material by the unit of order. The reserved orders for which a cut is reserved by using the inputting unit are memorized in a RAM. The photosensitive material is cut by a paper cutter at a point behind a place where the formation of images is complete for the reserved order.

2 Claims, 9 Drawing Sheets

IMAGE PRINTING SYSTEM

BACKGROUND OF THE INVENTION

1. Field of the Invention

The present invention relates to an image printing system, and more specifically to an image printing system which forms images continuously on a long photosensitive material.

2. Description of the Related Art

Image printing systems of this kind offer an advantage of forming images continuously on a photosensitive material, and therefore is beneficial to entities such as a large-scale image processing station where a large amount of printing is performed.

An example of a conventional art of this kind is disclosed in the Patent Document 1.

The Patent Document 1 discloses a printer which performs scanning exposure thereby continually forming images on a long photosensitive material. The disclosure includes cutters for cutting the photosensitive material. An example is a cutter which is not utilized in normal operations but used for cutting the photosensitive material when all of the exposed photosensitive material stored in a reservoir after the exposing operation is to be discharged. Another example is a cutter for cutting the photosensitive material when a sensor at the reservoir is unable to detect a loop of the material or when a problem arises in a developing apparatus for example.

(Patent Document 1)

Japanese Patent Laid-Open No. 9-171219

According to this conventional art, when the photosensitive material must be cut during continuous printing of a plurality of orders, the only way to do so is a forcible cutting. According to such a forcible cutting, a cutting command from the operator is executed right away, but the cutting of the photosensitive material occurs whether or not the order in process has been completed. Cutting of the photosensitive material in the middle of an order is a problem which decreases processing efficiency. It is also an inconvenience to the operator since he cannot leave until a more efficient timing for the cutting has come.

SUMMARY OF THE INVENTION

It is therefore a primary object of the present invention to provide an image printing system capable of improving convenience without decreasing efficiency in processing.

According to an aspect of the present invention, there is provided an image printing system for forming images continuously on a long photosensitive material, characterized in that cutting of the photosensitive material by the unit of order is reservable.

According to another aspect of the present invention, there is provided an image printing system for forming images continuously on a long photosensitive material, comprising: inputting means for making a reservation for cutting of the photosensitive material by the unit of order; storing means for memorizing a reserved order for which the reservation for cutting has been made via the inputting means; and cutting means for cutting at a point on the photosensitive material behind a place where image formation for the reserved order is complete.

The present invention enables to avoid cutting the photosensitive material in the middle of an order, but to ensure to cut the photosensitive material at an end of the order, making possible to improve processing efficiency. Further, the operator can make reservations for points where a cut is to be made. The operator can now leave the place, which leads to improved convenience.

Preferably, the image printing system further comprises winding means for winding the photosensitive material formed with at least an image. In this case, the wound piece of photosensitive material is a piece consisting of a complete order(s), enabling to handle the following operations also by the unit of order. This also improves processing efficiency.

The above mentioned object, other objects, characteristics, aspects and advantages of the present invention will become clearer from the following detailed description of an embodiment to be made with reference to the attached drawings.

DETAILED DESCRIPTION OF THE PREFERRED EMBODIMENTS

Hereinafter, an embodiment of the present invention will be described with reference to the drawings.

Figure 1:
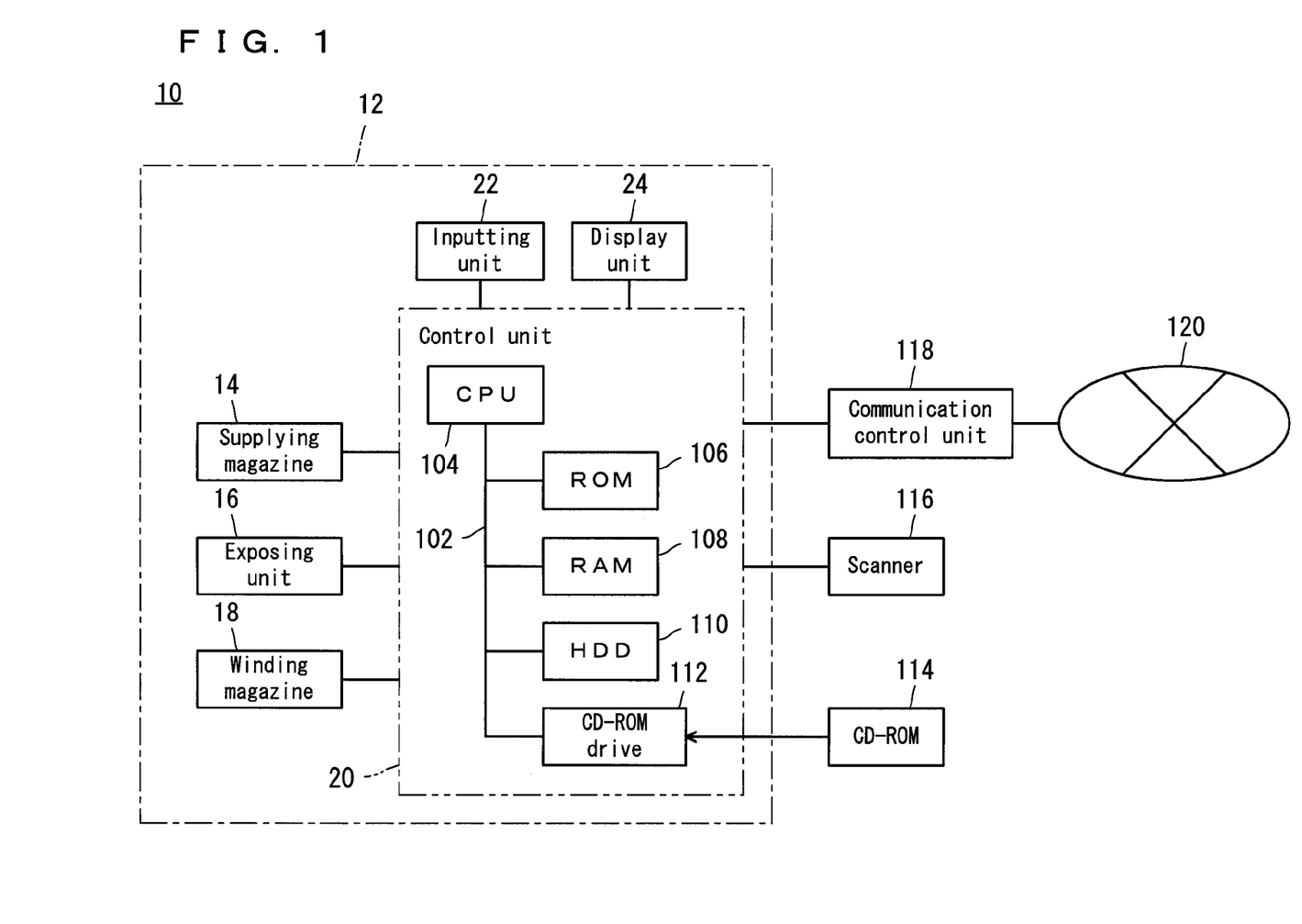
FIG. 1 is a block diagram of an embodiment of the present invention.
Figure 2:
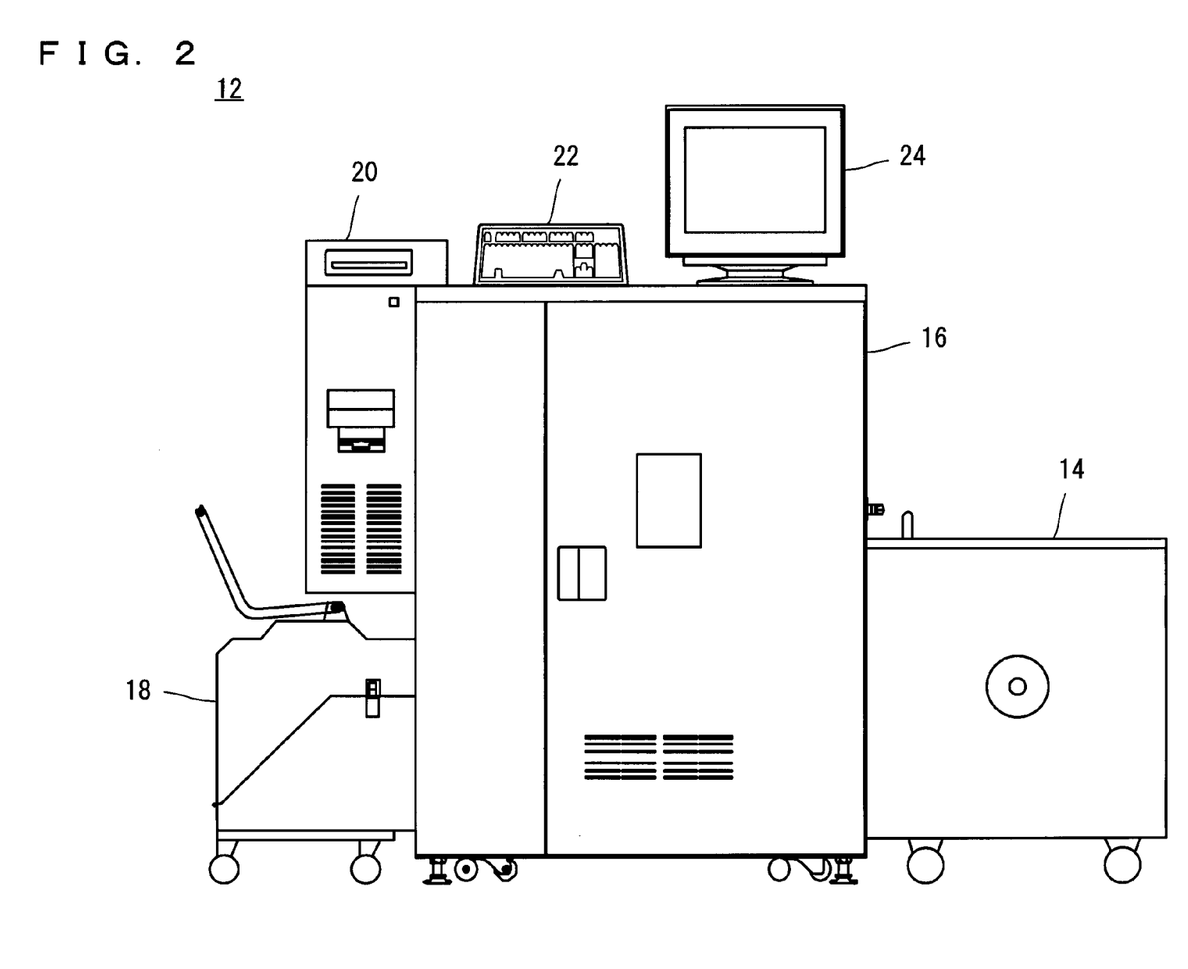
FIG. 2 is an external view showing an example of printing apparatuses to which the present invention is applied.
Figure 3:
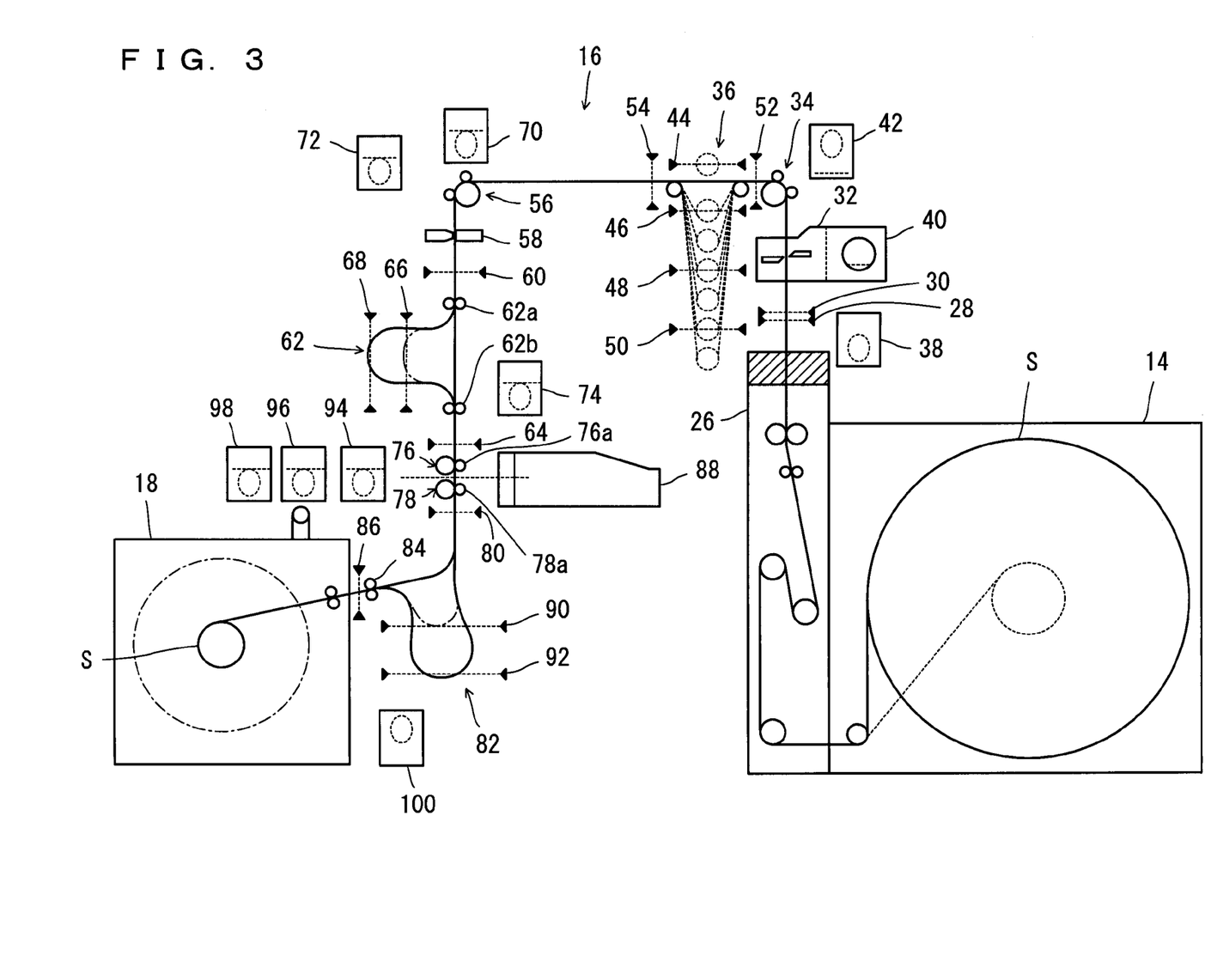
FIG. 3 is a schematic diagram outlining a printing apparatus to which the present invention is applied.

Referring to FIG. 1 through FIG. 3, an image printing system 10 as an embodiment of the present invention can be suitably used at a large-scale image processing station for example where a large amount of printing is performed. The image printing system 10 is a separate system in which formation of images on a printing paper S is performed separately from other tasks that follow, such as development of the images, cutting and sorting, etc.

The image printing system 10 includes a printing apparatus 12.

The printing apparatus 12 includes a supplying magazine 14 which holds a roll of printing paper S that is photosensitive material to feed, an exposing unit 16 which performs exposure (printing) onto the printing paper S, a winding magazine 18 which winds the exposed printing paper S back into a roll, a control unit 20 which controls operations of the printing apparatus 12, an inputting unit 22 such as a keyboard and a mouse to allow an operator to enter data and issue commands, and a display unit 24 which displays GUIs (GUI: Graphical User Interface) and other information to assist the operator in working with the printing apparatus 12.

As shown in FIG. 3, the exposing unit 16 includes a supplying unit 26 for unwinding the roll of printing paper S held in the supplying magazine 14. On a transport path of the long printing paper S unwound by the supplying unit 26, and on a downstream side of the supplying unit 26, there is disposed a paper end sensor 28 for detecting an end of the printing paper S, a splice sensor 30 for detecting a splice in the printing paper S, a paper cutter 32 for cutting the printing paper S in an order cutting, a forcible cutting and other cutting operations, guide rollers 34 for changing a direction of the printing paper S, and a loop forming unit 36.

The supplying unit 26 includes rollers in the unit, which are driven by a motor 38. The paper cutter 32 and the guide rollers 34 are driven by a motor 40 and a motor 42 respectively.

The loop forming unit 36 absorbs e.g. tension in the printing paper S. In addition, sensors 44 through 50 are provided in order to detect the loop size of the printing paper S formed by the loop forming unit 36.

Essentially the same construction is used for loop forming units 62 and 82 to be mentioned later.

Before and after the loop forming unit 36 are paper sensors 52 and 54 disposed for detecting positions of the printing paper S. Information from the sensors is used to detect paper jamming, positions of the printing paper S and so on. Other paper sensors 60, 80 and 86 all serve the same purposes.

Further along the transporting path of the printing paper S, there are disposed guide rollers 56 for changing the direction of the printing paper S, a punch 58 for forming punch holes as marks on the printing paper S, the paper sensor 60, the loop forming unit 62 and a mark sensor 64 for detecting the marks for purposes of exposing and other operations.

Figure 4:
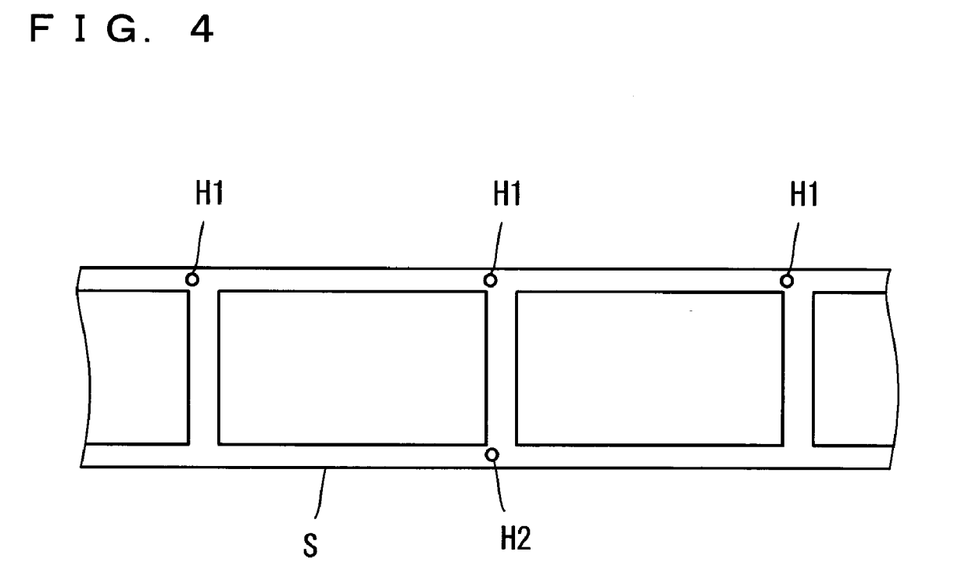
FIG. 4 shows an example of punch holes made in printing paper.

The mark sensor 64 detects the punch hole marks formed in the printing paper S, such as a cut mark H1 and an order mark H2 shown in FIG. 4. The cut mark H1 is made for each image (frame) whereas the order mark H2 is made for each order. The loop forming unit 62 is provided with sensors 66 and 68 disposed near by, for detecting a loop formed in the printing paper S.

The guide rollers 56 are driven by a motor 70. A pair of rollers 62a and a pair of rollers 62b of the loop forming unit 62 are driven by a motor 72 and a motor 74 respectively.

On the downstream side of the mark sensor 64 are transporting roller pairs 76 and 78. Further disposed are the paper sensor 80, a loop forming unit 82, a transporting roller pair 84, and the paper sensor 86. Between the transportation roller pairs 76 and 78, the long printing paper S receives scanning exposure from the exposing unit 88, and thus a plurality of latent images are formed continuously. The loop forming unit 82 is provided with sensors 90 and 92 disposed near by, for detecting a loop in the printing paper S.

The transporting roller pairs 76 and 78 are driven by a motor 94. The transporting roller pair 76 includes a pressing roller 76a which is driven to press and release by a motor 96. Likewise, the transporting roller pair 78 includes a pressing roller 78a which is driven to press and release by a motor 98, and the transporting roller pair 84 is driven by a motor 100.

The printing paper S is processed by the exposing unit 16 described above, and then wound by the winding magazine 18 into a roll, as undeveloped. Thereafter, the printing paper S is moved manually for example to another unillustrated processing apparatus for development, cutting and sorting, to be made into finished prints.

Returning to FIG. 1, the supplying magazine 14, the exposing unit 16, the winding magazine 18, the inputting unit 22, the display unit 24 and so on are controlled by the control unit 20.

The control unit 20 includes a CPU 104, a ROM 106, a RAM 108, a hard disc drive (HDD: including hard discs) 110 and a CD-ROM drive 112, all interconnected with a bus 102.

The CPU 104 runs a variety of programs stored in the ROM 106, the HDD 110 and so on, sending commands to different components in the printing apparatus 12, a scanner 116 and a communication control unit 118, and controlling operations of the image printing system 10.

The ROM 106 stores a startup program and other programs. The startup program is executed by the CPU 104 when power is turned ON to the printing apparatus 12. The execution loads the RAM 108 with an operating system (OS) and other programs stored in the HDD 110 so that variety of processing and controlling operations can be ready to run.

The RAM 108 provides space for programs used to control the printing apparatus 12, holding such information as results of operations performed by the programs, temporary data for processing, display data (e.g. text data and image data) and so on for displaying GUIs for example, on a screen of the display unit 24, as well as providing a working area for the CPU 104. The display data prepared in the RAM 108 is sent to the display unit 24. The display unit 24 displays information (e.g. text and images) represented by the display data. Examples of the display are GUI screens in FIG. 5 and FIG. 6. The RAM 108 also memorizes information whether or not each order is a reserved order for which an order cut is reserved (indicated by an order-cut icon 206).

The HDD 110 is a device which is controlled by the CPU 104 and reads and records programs, control data, text data, image data and other information to and from the hard discs.

Figure 7:
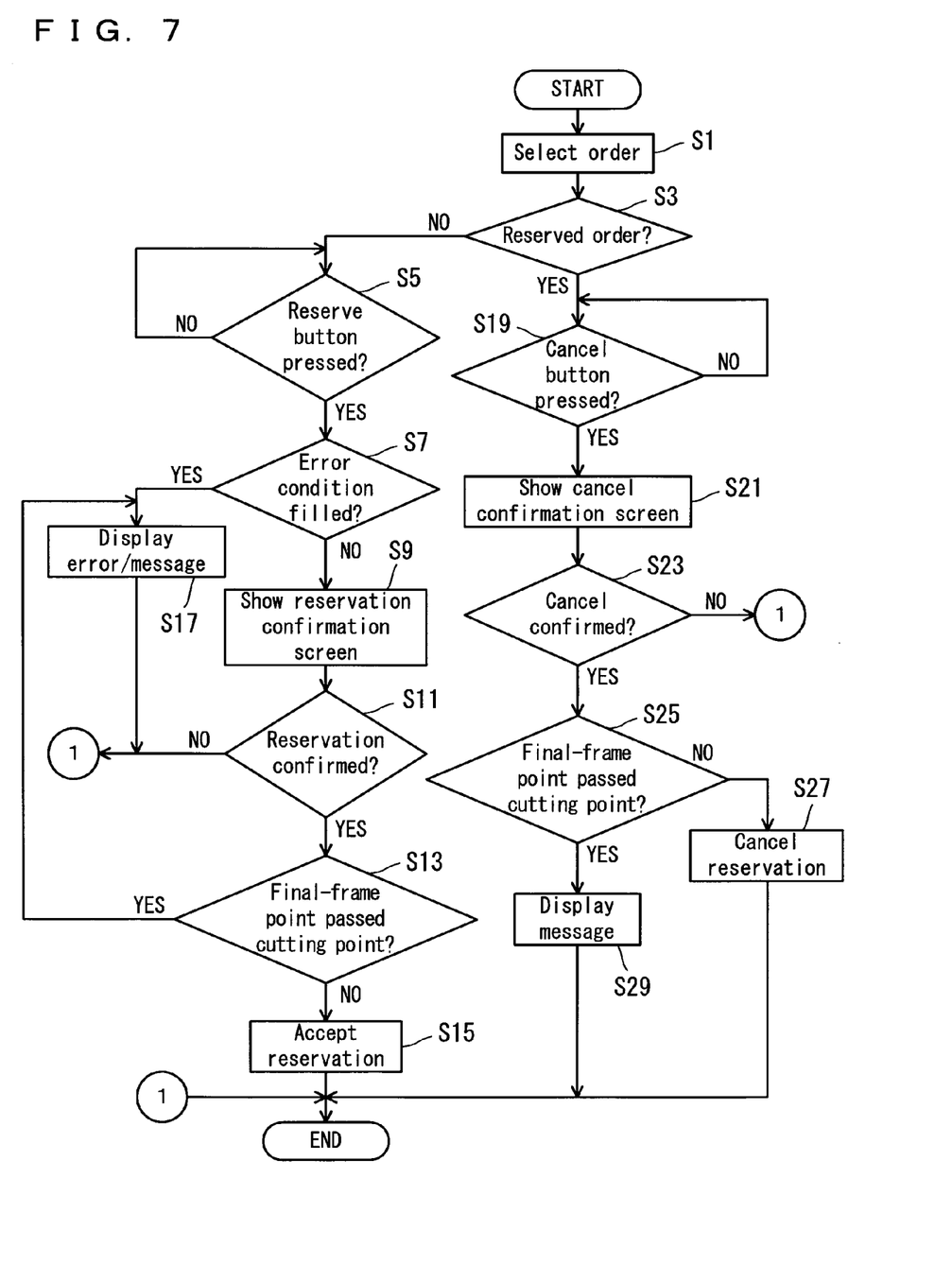
FIG. 7 is a flowchart showing an example of steps for reserving and canceling an order cut.
Figure 8:
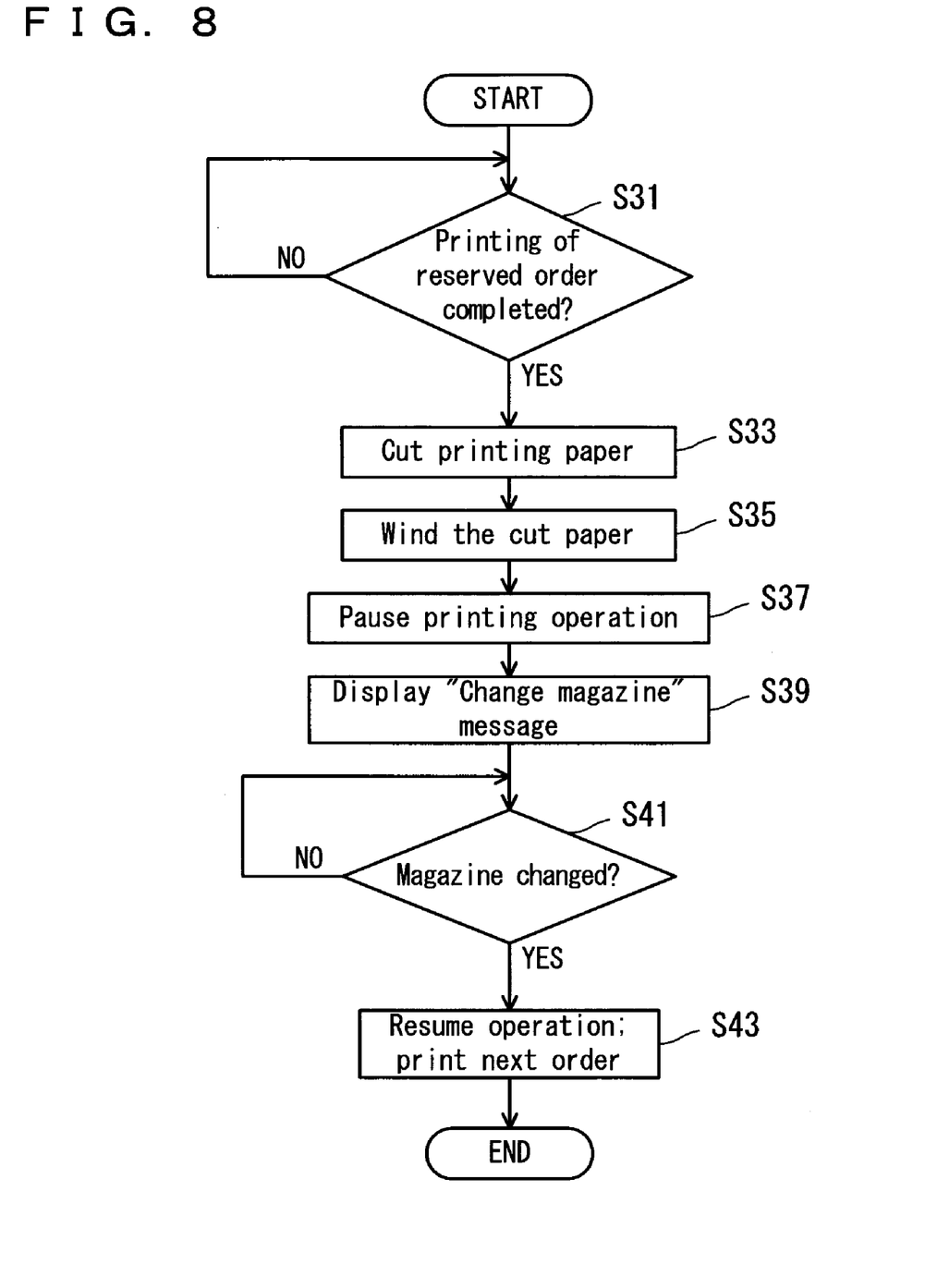
FIG. 8 is a flowchart showing an example of steps to perform an order cut operation.
Figure 9:
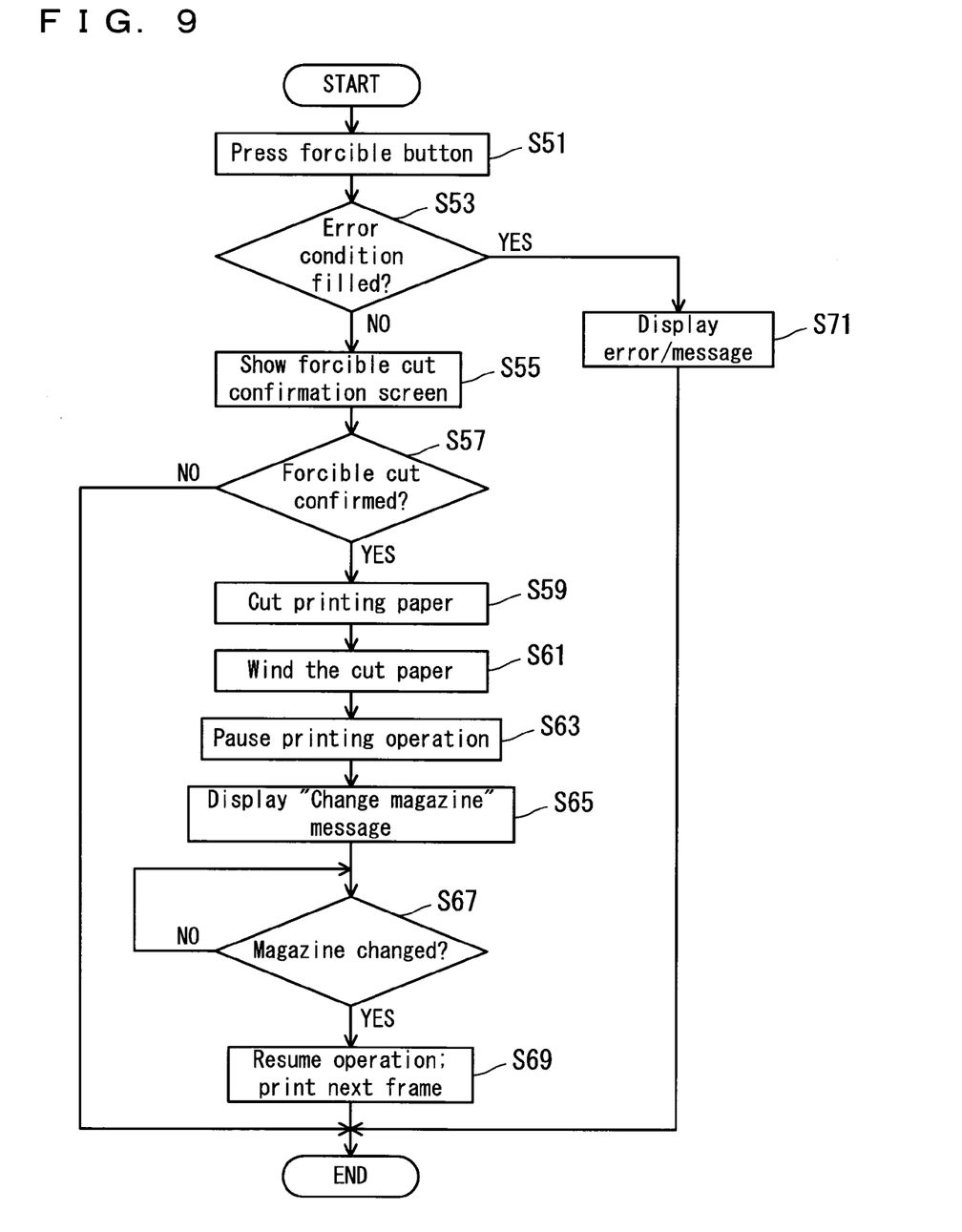
FIG. 9 is a flowchart showing an example of steps to perform a forcible cut operation.

In this embodiment, the hard discs in the HDD 110 store programs necessary for performing operations shown in FIG. 7 through FIG. 9, and image data of images to be printed on the printing paper S for each order. The programs are read out and run by the CPU 104, and thus the operations are performed. Each image data is provided with an ID unique to the order it belongs to. The ID corresponds to a reception number displayed at the head of order information 200 shown in FIG. 5 (The reception numbers are represented by numbers "2" through "7" in the figure).

The CD-ROM drive 112 reads programs and data stored in a CD-ROM 114, under the control of the CPU 104.

The control unit 20 is connected to the scanner 116. The scanner 116 reads images to be formed on the printing paper S and prepares image data. The prepared image data is stored in the HDD 110. Further, the control unit 20 is connected to the communication control unit 118. The communication control unit 118 is connected to a network 120 such as the Internet, and capable of receiving and storing image data from other apparatuses via the network as well as sending and receiving data and uploading/downloading programs and data to and from other apparatuses under the control provided by the CPU 104.

Figure 5:
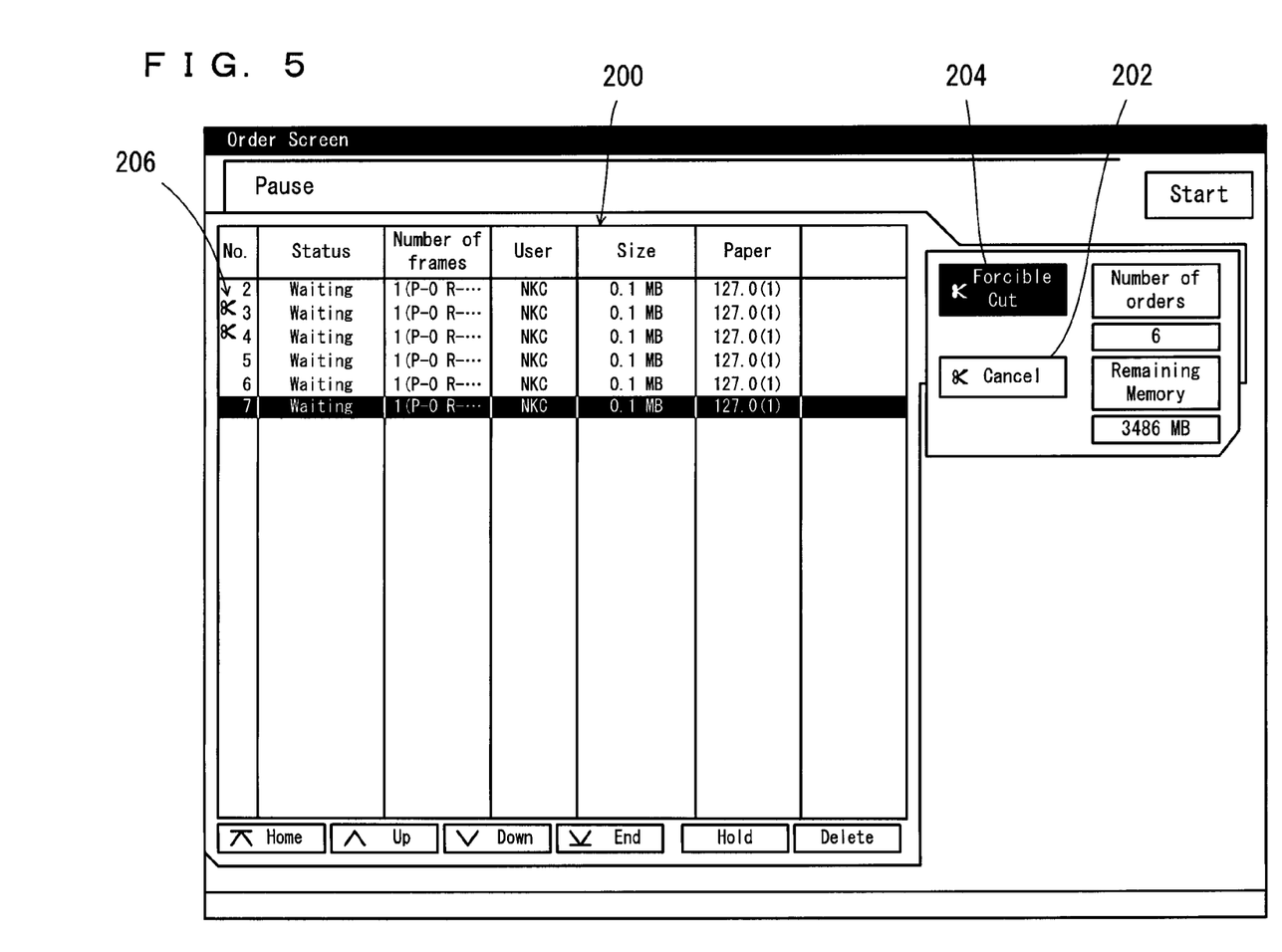
FIG. 5 shows an example of GUI screens presented in a display unit.

The display unit 24 displays GUI screens such as shown in FIG. 5. The screen shows the order information 200, a reserve/cancel button 202 and forcible cut button 204. FIG. 5 shows a case in which there are six orders.

It should be noted here that "unit of order" can be any. For example, the unit of order may be a distribution center or an individual consumer. Similarly, if orders are from a school for example, the unit of order may be an individual student.

The term "order cut" means that the printing paper S is cut behind a point where a complete set of prints has been finished for a selected order. This enables to cut the printing paper S by the unit of order (at the end of any orders).

An order cut can be reserved for each order via the inputting unit 22. A reserved order cut is so indicated by an order-cut icon 206 which appears at the head of the order information 200, and the printing paper S is cut by the paper cutter 32, behind a point where a complete set of prints has been finished for this particular order.

The reserve/cancel button 202 is displayed either as a reserve button or as a cancel button. Hereinafter, the button will be called the reserve button 202 or the cancel button 202 depending on situations. When a selection is made from a list of orders displayed on the screen, for an order accompanied by an order-cut icon 206, the reserve/cancel button 202 appears as the cancel button. When the selected order is not accompanied by an order-cut icon 206, then the reserve/cancel button 202 appears as the reserve button. Note that FIG. 5 shows the cancel button.

Next, reference is made to FIG. 7 through FIG. 9, to describe examples of operation performed by the image printing system 10.

Referring first to FIG. 7, description will cover how an order cut can be reserved and canceled. It should be noted here that an order cut can be reserved and canceled while printing is being made as well as while printing is paused (during a waiting mode).

The display unit 24 shows a GUI screen as shown in FIG. 5. When an order is selected on the screen (Step S1), the control unit 20 checks if the selected order is a reserved order or not (Step S3). If the selected order is not a reserved order, the control unit 20 further checks if the reserve button 202 has been pressed (Step S5).

The control unit 20 waits until the reserve button 202 has been pressed. When the reserve button 202 is pressed, the control unit 20 checks if error conditions are filled (Step S7). In this step, the error conditions are satisfied if the system is performing an order cut for a reserved order, or if the system is in suspension (due to an error, when responding to the error, or when the system is halted for maintenance).

Figure 6:
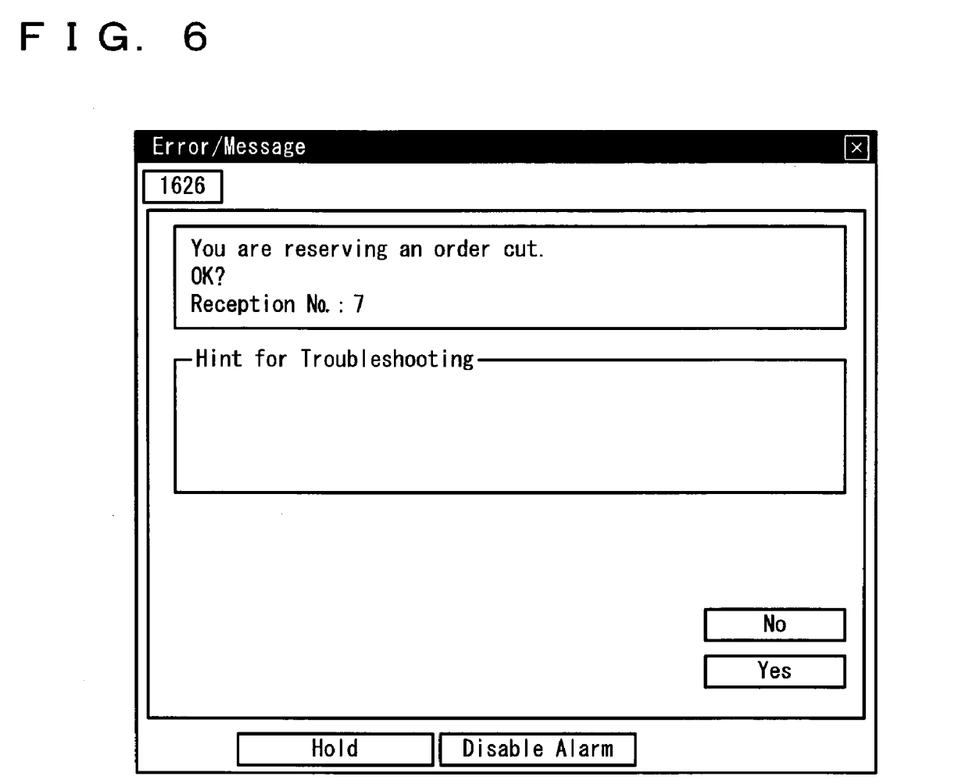
FIG. 6 shows another example of GUI screens presented in the display.

If the error conditions are not filled, the control unit 20 displays on the display unit 24 a reservation confirmation screen as shown in FIG. 6 for example, giving a question such as "You are reserving an order cut. OK? Reception No. 7 (Yes/No)" (Step S9). The control unit 20 checks if the operator has confirmed the reservation on the reservation confirmation screen (Step S11). When a "Yes" button is selected and the confirmation is made on the screen, the control unit 20 checks if a point on the printing paper S which corresponds to the last frame in the selected order (hereinafter called "final-frame point" as necessary) has already passed a cutting point (where the paper cutter 32 is placed) (Step S13).

The final-frame point on the printing paper S can be obtained as follows for example:

Based on order information stored in the HDD 110 or elsewhere, the control unit 20 calculates how many frames there are after the currently exposed frame (the frame which has been exposed by an exposure head 88) to the last frame. The control unit 20 also can acquire the length of each frame (along the printing paper) for the frames to be printed. Based on these values, the control unit 20 can calculate a distance from the currently exposed frame to the last frame, and thereby identify the final-frame point on the printing paper S.

On the other hand, a distance from the exposure position to the paper cutter 32 along the transport path of the printing paper S can be obtained in advance from the structure of printing unit 12.

Therefore, the control unit 20 can determine if the final-frame point has passed the cutting point, based on the transportation distance of the printing paper and the final-frame point.

If Step 13 finds that the final-frame point has not yet passed the cutting point, the reservation is accepted (Step S15). At this point, the selected order is memorized as a reserved order in the RAM 108, and an order-cut icon 206 is added to the left end of the selected order name displayed on the screen, before the routine comes to an end.

On the other hand, if Step S7 finds that the error conditions are filled, the process goes to Step 17, where a massage is displayed saying that the order cut cannot be reserved, together with a specific reason, and the routine comes to the end.

If Step S13 finds that the final-frame point on the printing paper S has already passed the cutting point, the process goes to Step S17, to display such a massage that "The order cut cannot be reserved because the final-frame point has already passed the cutting point," and the routine comes to the end. If Step S11 finds that a "No" button is selected on the reservation confirmation screen, the routine comes to the end.

On the other hand, if Step S3 sees that the selected order is a reserved order, then the control unit 20 checks if the cancel button 202 has been pressed (Step S19). The control unit 20 waits until the cancel button 202 has been pressed. When the cancel button 202 is pressed, the control unit 20 displays on the display unit 24 a cancellation confirmation screen, giving a question such as "You are canceling the order cut. OK? Reception No. 7 (Yes/No)" (Step S21). The control unit 20 checks if the operator has confirmed the cancellation (Step S23). When a "Yes" button is selected and the confirmation is made on the screen, the control unit 20 checks if a point on the printing paper S corresponding to the last frame in the selected order has already passed the cutting point (Step S25). If the final-frame point has not yet passed the cutting point, the cancellation is accepted (step S27). At this point, the selected order is memorized as a non-reserved order in the RAM 108, and the order-cut icon 206 is deleted from the left end of the selected order name displayed on the screen, before the routine comes to the end.

If Step S23 finds that a "No" button is selected on the cancellation confirmation screen, the routine comes to the end.

If Step S25 finds that the final-frame point on the printing paper S has already passed the cutting point, the control unit 20 displays on the display unit 24 a massage saying for example, "The order cut reservation was not cancelled because the final-frame point has already passed the cutting point," (Step S29) and the routine comes to the end.

Next, reference is made to FIG. 8 to describe an example of order cut operation.

The order cut operation is enabled when a reserved order enters an in-process phase of the printing operation.

In the order cut operation, the control unit 20 checks if the reserved order has all of its prints completed, i.e. if all of the frames included in the order have been exposed by the exposing unit 88 (Step S31). The control unit 20 waits till all of the prints have been completed, and when the printing is over, the paper cutter 32 cuts the printing paper S (Step S33). At this point, the printing paper S is cut behind the final-frame point. The printing paper S which has been cut is wound up by the winding magazine 18 (Step 35), which causes the printing apparatus 12 to pause (Step S37), and to prompt the operator for changing the winding magazine by displaying such a message as "Winding is complete. Change magazine, please," (Step S39). The control unit 20 checks if the winding magazine 18 has been changed (Step S41) and waits until the winding magazine 18 has been changed. Once the winding magazine 18 is changed, the system resumes the printing operation, beginning a new printing cycle for the next order which comes right after the finished reserved order (Step S43), and ends the order cut operation. Step S43 is not executed if there is no reason to resume the printing e.g. when there are no more orders.

Reference will now be made to FIG. 9 to describe an example of forcible cutting operation.

The display unit 24 shows a GUI screen as in FIG. 5. When the forcible cut button 204 is pressed (Step S51), the control unit 20 checks if an error condition is filled (Step S53).

In this stage, the error condition is filled if the system is halted.

If the error conditions are not filled, the control unit 20 displays on the display unit 24 a forcible cut confirmation screen, giving a question such as "You are trying to cut the printing paper right now. OK? (Yes/No)" (Step S55). The control unit 20 checks if the operator has confirmed the forcible cut (Step S57). When a "Yes" button is selected and the confirmation is made on the forcible cut confirmation screen, the control unit 20 has the paper cutter 32 cut the printing paper S right away (Step S59).

If Step S57 finds that a "No" button is selected, the operation comes to an end without cutting the printing paper S.

After the printing paper S is cut in Step S59, the printing paper S which has been cut is wound up by the winding magazine 18 (Step 61), which causes the printing apparatus 12 to pause (Step S63), and to prompt the operator for changing the winding magazine by displaying such a message as "Winding is complete. Change magazine, please," (Step S65). The control unit 20 checks if the winding magazine 18 has been changed (Step S67) and waits until the winding magazine 18 has been changed. Once the winding magazine 18 is changed, the system resumes the printing operation, beginning a new printing cycle for the next frame which comes right after the frame that is already printed on the wound roll of printing paper S (Step S69), and ends the forcible cut operation. Step S69 is not executed if there is no reason to resume the printing, e.g. when there are no more frames to print.

On the other hand, if Step S53 finds that the error condition is filled, the control unit 20 displays on the display unit 24 a massage, such as "The forcible cut was not successful" (Step S71), and the operation comes to the end without performing a forcible cut.

According to the image printing system 10 described as the above, the operator can simply reserve an order cut, then the printing apparatus 12 will automatically detects completion of a printing cycle performed for the reserved order, and causes the paper cutter 32 to cut the printing paper S. This ensures that the printing paper S is reliably cut at the end of each selected order, leading to improved processing efficiency.

As has been described, an ability to perform automatic cutting for any orders selected from a continuous chain of orders allows the operator to leave the place once reservations have been made, making the image printing system a convenient system for the operator.

Further, it is now possible to make cuts reliably by the unit of order, which means that the wound piece of photosensitive material S is a piece consisting of a complete order(s). This enables to handle the developing and later operations also by the unit of order, leading to improved processing efficiency and consistent printing qualities within each order.

Further, the display unit 24 displays not only the reserve/cancel button 202 for a normal order cut but also the forcible cut button 204 for a forcible cut, offering easy options of order cutting in normal operations and forcible cutting in emergency situations.

Further, the order information 200 displayed on the screen includes the order-cut icons 206, which makes easy to grasp which orders will cause automatic cutting.

An order cut can be reserved for a plurality of orders. Therefore, order cut reservations can be made at one time, which will help the operator who might otherwise forget to make reservations.

The reserved order cuts can be cancelled, which provides flexibility to respond to changes in situations after the order cut reservations are made.

Still further, the system may also have a function to ask for a choice if "the reserved order cut should be canceled or not" when the printing paper has run out before the end of printing a reserved order. This enables to change a scheduled timing of cut in response to changes in situations.

It should be noted here that in the order cut operation example shown in FIG. 8, cutting is made after printing has been finished. This sequence depends upon factors such as how much margin should be taken in the printing paper S after the final frame and how the other relevant apparatuses are laid out. The cutting action may not necessarily take place after the printing (exposing) is finished as long as the printing paper S is cut behind the final-frame point which is the point at which the printing operation is complete for the reserved order.

The present invention is applicable to any printing apparatuses and printing systems in which a plurality of images are formed (by exposure) continuously in a longitudinal direction on a long photosensitive material prepared as a roll and then the photosensitive material is cut.

The photosensitive material used in the present invention may not necessarily be printing paper, but may be cloth, plastic film and so on.

The present invention being described in detail and illustrated thus far, it is obvious that these description and drawings only represent an example of the present invention, and should not be interpreted as limiting the invention. The spirit and scope of the present invention is only limited bywords used in the accompanied claim.

What is claimed is:

1. An image printing system for forming images continuously on a long photosensitive material, comprising:
   inputting means for reserving by an order whether to cut the photosensitive material or not;
   storing means for memorizing a reserved order for which the reservation for cutting has been made via the inputting means; and
   cutting means for cutting at a point on the photosensitive material behind a place where image formation for the reserved order is complete.

2. The image printing system according to claim 1, further comprising winding means for winding the photosensitive material formed with at least an image.

* * * * *